United States Patent [19]

Prochazka et al.

[11] 4,081,284

[45] Mar. 28, 1978

[54] SILICON CARBIDE-BORON CARBIDE SINTERED BODY

[75] Inventors: Svante Prochazka, Ballston Lake, N.Y.; William S. Coblenz, Cambridge, Mass.

[73] Assignee: General Electric Company, Schenectady, N.Y.

[21] Appl. No.: 711,550

[22] Filed: Aug. 4, 1976

[51] Int. Cl.² ............................................ C04B 35/56
[52] U.S. Cl. ..................................................... 106/44
[58] Field of Search .......................................... 106/44

[56] References Cited

U.S. PATENT DOCUMENTS

| 2,805,197 | 9/1957 | Thibault et al. | 106/44 |
| 3,649,342 | 3/1972 | Bartlett | 106/44 |

*Primary Examiner*—J. Poer
*Assistant Examiner*—Mark Bell
*Attorney, Agent, or Firm*—Jane M. Binkowski; Joseph T. Cohen; Jerome C. Squillaro

[57] ABSTRACT

A particulate mixture of β-silicon carbide, boron carbide and a carbonaceous additive is formed into a green body and sintered producing a sintered body with a density of at least about 85% containing boron carbide in an amount ranging from about 10% to about 30% by weight of the total amount of silicon carbide and boron carbide present.

4 Claims, 1 Drawing Figure

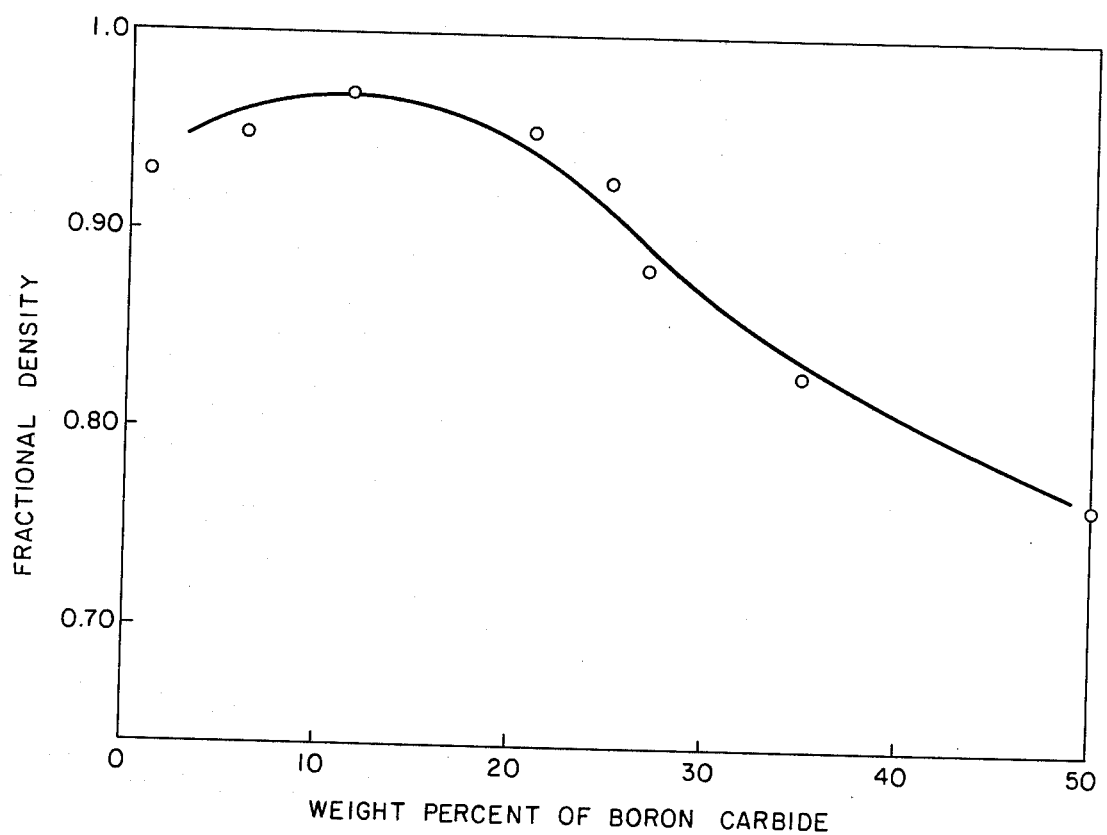

SILICON CARBIDE-BORON CARBIDE SINTERED BODY

The present invention relates to a method of producing novel polycrystalline silicon carbide-boron carbide sintered bodies over the composition range of about 10% by weight to 30% by weight of boron carbide. The sintered bodies have a density of at least about 85% and are useful as light weight refractory ceramics.

The chemical and physical properties of silicon carbide make it an excellent material for high temperature structural applications.

$B_4C$ is a very hard, lightweight solid (Knoop Hardness number 3,500–4,500, specific weight 2.52 g/cc).

Sintering in the $SiC-B_4C$ system was observed by Billington et al (S.R. Billington, J. Chown, A.E.S. White "The Sintering of Silicon Carbide" in "Special Ceramics", Vol. 2, P. Popper ed 1962) to proceed at temperatures 2200° C and above due to formation of a eutectic melt. However, as a result of the large volume change of the melt on solidification dense bodies are not obtained where liquid assisted sintering occurs. This problem was solved by using infiltration of the $B_4C-SiC$ eutectic into SiC compact followed by solidification in a temperature gradient by S. Prochazka; this technique yields nonporous bodies in the $SiC-B_4C$ system and is disclosed in U.S. Pat. No. 3,852,099 to S. Prochazka and assigned to the assignee hereof. The limitation of this process results from rapid coarsening during infiltration and the subsequent hold at temperatures near 2,300° C so that no fine grained microstructures may be obtained. Also, microcrack formation due to the thermal expansion mismatch between the SiC matrix and the $B_4C-SiC$ eutectic is a limiting factor in obtaining strong materials by this process.

In copending application, Ser. No. 679,207 filed Apr. 22, 1976, now U.S. Pat. No. 4,004,934 in the name of Svante Prochazka and assigned to the assignee hereof, there is disclosed a method of producing a silicon carbide sintered body by forming a mixture of submicron powder composed of $\beta$-silicon carbide, boron or boron carbide equivalent to about 0.3–3.0% by weight of boron and free carbon into a green body and sintering it at a temperature of about 1,900° C to 2,100° C.

In copending application, Ser. No. 681,706 filed Apr. 29, 1976, in the name of Svante Prochazka and assigned to the assignee hereof, there is disclosed a method of producing a silicon carbide sintered body having N-type semiconducting properties by forming a mixture of $\beta$-silicon carbide, boron or boron carbide equivalent to about 0.3–3.0% by weight of boron and 0.1% to 1.0% by weight of free carbon into a green body and sintering it at a temperature ranging from about 2,180° C to 2,300° C.

The onset of exaggerated growth of large tabular $\alpha$-silicon carbide crystals on densification of $\beta$-silicon carbide powders doped with boron is a limitation to obtaining the uniform fine-grained microstructures necessary to withstand fracture. This phenomenon is related to the transformation of $\beta$-silicon carbide into the thermodynamically more stable $\alpha$-SiC phase at temperatures of about 2,000° C and higher. One advantage of the present process is that it provides improved grain growth control on sintering of silicon carbide by providing a sufficient amount of boron carbide significantly uniformly dispersed throughout the body so that early in their development, the growing $\alpha$-SiC grains impinge on the boron carbide grains, cease to grow resulting in a sintered product with a significantly or substantially uniform relatively fine grained microstructure.

Briefly stated, the process of the present invention comprises providing a substantially homogeneous particulate dispersion or mixture, wherein the particles are submicron or substantially submicron in size, of $\beta$-silicon carbide powder, at least about 10% by weight of boron carbide and a carbonaceous additive which is free carbon or a carbonaceous organic material which is heat-decomposible to produce free carbon, shaping the mixture into a green body, and sintering the green body at a temperature ranging from about 2,000° C up to below the melting point of the silicon carbide-boron carbide eutectic in an atmosphere in which the green body and resulting sintered body is substantially inert to produce a sintered body having a density of at least about 85%.

The % density given herein for a green or sintered body is, unless otherwise stated, the fractional density of the theoretical density of silicon carbide and boron carbide based on the particular amounts of silicon carbide and boron carbide present.

Amounts of silicon carbide, boron carbide and free carbon given herein are, unless otherwise stated, by weight of the total amount of silicon carbide and boron carbide present.

Those skilled in the art will gain a further and better understanding of the present invention from the detailed description set forth below, considered in conjunction with the drawing figure, accompanying and forming a part of the specification, which is a graph showing fractional densities of silicon carbide sintered with boron carbide additions at 2,080° C–2,090° C. The graph illustrates the present invention with amounts of boron carbide ranging from about 10% by weight to about 30% by weight and shows that with increasing amounts of boron carbide higher than about 12% by weight the density of the resulting silicon carbide-boron carbide sintered product decreased.

The present invention provides a number of advantages. One advantage is that it results in a novel light weight but hard ceramic. Another advantage is that since it provides grain growth control of $\alpha$-SiC, when it forms, sintering can be carried out through a wide temperature range which is particularly economical and practical since it eliminates the need for critical temperature controls. This grain growth control makes possible the production of large sintered bodies in large furnaces where the temperature gradient frequently is larger than 100° C since early exaggerated $\alpha$-SiC grain growth triggered in that part of the body exposed to the higher temperatures is inhibited.

Another advantage is that the boron carbide particles prevent significant grain growth of the $\beta$-silicon carbide resulting in a sintered product wherein the $\beta$- and $\alpha$-silicon carbides have the same morphology, i.e., the $\beta$-and $\alpha$-silicon carbide grains are of essentially the same shape and are not distinguishable by microscopic techniques. Their particular shape or morphology is determined by the boron carbide present. However, X-ray analysis of the sintered product will give the bulk percent of $\alpha$- and $\beta$-silicon carbides present.

In carrying out the present process a substantially homogenous particulate dispersion of the silicon carbide, boron carbide and free carbon or carbonaceous organic material is formed. In order to form a homogeneous dispersion, the particles should be of submicron size or of substantially submicron size to produce a sintered product with significantly uniform properties. The α-silicon carbide is preferably single phase or contains α-silicon carbide in an amount less than about 1% by weight of the total amount of SiC present. The β-SiC is of submicron particle size or breaks down to such size in forming the dispersion. The β-SiC particle can be comprised of a single crystallite or an aggregate of crystallites and preferably has a mean surface average crystallite size ranging up to 0.45 micron, generally from about 0.05 micron to 0.4 micron, and most preferably from about 0.1 micron to 0.2 micron.

The β-silicon carbide powder can be prepared by a number of techniques as, for example, by direct synthesis from the elements, by reduction of silica, or by pyrolysis of compounds containing silicon and carbon. A number of processes which involve the pyrolysis of silicon compounds and organic compounds to produce silicon and carbon are particularly advantageous since they can be controlled to produce β-silicon carbide of desired submicron sized crystallites. Plasma techniques are especially preferred for producing the powders useful in the present invention. The final product generally requires leaching, especially to remove any elemental silicon which may be present.

The carbonaceous additive is used in an amount equivalent to about 0.1% by weight to about 1.0% by weight of free carbon based on the total amount of silicon carbide and boron carbide. Specifically, the carbonaceous additive is particulate free carbon of submicron size such as, for example, acetylene black, or a carbonaceous organic material which is heat-decomposible to produce particulate free carbon of submicron size in the required amount. In addition, the carbonaceous organic material is a solid or liquid at room temperature and completely decomposes at a temperature in the range of about 50° C to 1,000° C to yield free carbon and gaseous product of decomposition. Also, the carbonaceous organic material is one which has no significant deteriorating effect on the silicon carbide, boron carbide or the resulting sintered product.

In the present invention, the oxygen content of the silicon carbide powder preferably is less than about 1% by weight of the total amount of silicon carbide used, and for best results less than about 0.4% by weight. This oxygen content is determinable by standard techniques and generally, it is present largely in the form of silica.

The free carbon in the present process reduces silica which always is present in silicon carbide powders in small amounts or which forms on heating from oxygen adsorbed on the powder surfaces. The free carbon reacts during heating with silica according to the reaction: $SiO_2 + 3C \rightarrow SiC + 2CO$. Silica, when present in the SiC powders in appreciable amounts, halts densification of silicon carbide completely so that little or no shrinkage, i.e., densification, is obtained.

The free carbon also acts as a getter for free silicon if present in the powders or if it is formed by the following reaction during heating up to the sintering temperature: $SiO_2 + 2SiC \rightarrow 3Si + 2CO$. The presence of silicon, just as the silica, tends to halt or retard densification of SiC.

The specific amount of submicron free carbon required in the present process depends largely upon the oxygen and silicon content in the starting SiC powder, and to some extent on the oxygen content in the boron carbide powder, and ranges from about 0.1% to about 1.0% by weight of the total amount of silicon carbide and boron carbide used. Amounts of free carbon significantly in excess of about 1% by weight do not provide any significant advantage and function much like permanent pores in the sintered product limiting its ultimate achievable density and strength.

High molecular weight aromatic compounds are the preferred carbonaceous organic materials for making the carbon addition since they ordinarily give on pyrolysis the required yield of particulate free carbon of submicron size. Examples of such aromatic compounds are a phenolformaldehyde condensate-novolak which is soluble in acetone or higher alcohols, such as butyl alcohol, as well as many of the related condensation products, such as resorcinolformaldehyde, aniline-formaldehyde, and cresolformaldehyde. Another satisfactory group of compounds are derivatives of polynuclear aromatic hydrocarbons contained in coal tar, such as dibenzanthracene and chrysene. A preferred group of carbonaceous additives are polymers of aromatic hydrocarbons such as polyphenylene or polymethylphenylene which are soluble in aromatic hydrocarbons and yield on heat-decomposition up to 90% of free carbon.

Another approach to improved carbon distribution on a submicron particle size level is the application of jet milling. The silicon carbide powder is soaked with a solution of, for instance, a novolak resin in acetone, dried in air and heated up to 500° C to 800° C in nitrogen to pyrolyze the resin. The actual amount of carbon introduced by this process is determined as weight gain after the pyrolysis or by analysis of free carbon. The powder with the added carbon is then jet milled which greatly improves the distribution of carbon and eliminates major carbon grains in the sintered product The boron carbide powder used to produce the present product can be of a composition wherein the boron/carbon molar ratio ranges from 6.5 to 4.0. The boron carbide powder is preferably free of oxygen or preferably contains oxygen in an amount less than 1% by weight of the boron carbide. Oxygen content is determinable by standard techniques and it is generally present in the form of an oxide. To reduce oxygen content, the boron carbide powder is preferably calcined in a vacuum or inert gas such as argon at a temperature ranging from about 1,400° C to 1,600° C.

Commercially prepared boron carbide powder is useful in the present invention since the metallic impurities normally present in such powder do not inhibit its sinterability. Such impurities include metals such as Mg and Al, Fe, Ni and Co.

The boron carbide powder is of submicron particle size or breaks down to such size in forming the dispersion. The boron carbide particle can be comprised of a single crystallite or an aggregate of crystallites. The boron carbide should be finer or about equivalent in crystallite or particle size to silicon carbide.

The boron carbide powder is used in an amount ranging from about 10% by weight to about 30% by weight of the total amount of silicon carbide and boron carbide used. Amounts of boron carbide of about 10% by weight or higher are sufficient to suppress exaggerated grain growth of the α-SiC phase significantly uniformly throughout the body during sintering thus providing a control of the microstructure which is not achievable with amounts of boron carbide less than 10% by weight. On the other hand, amounts of boron carbide higher than about 30% by weight do not produce a sintered product with a density of at least 85%.

The particular amount of boron carbide used is determinable empirically. It depends largely on the particular properties desired in the final product. For example, increasing amounts of boron carbide lower the achievable terminal density in the sintered product and lessen its oxidation resistance but result in a more light weight ceramic. During sintering, a minor amount of the boron carbide, i.e., about 0.53%, which is equivalent to about 0.4% by weight of boron, enters into solid solution with the silicon carbide. The more thoroughly the boron carbide is dispersed in the mixture, the more uniform is the density of the sintered product as well as the microstructure.

The present substantially homogeneous particulate dispersion or mixture of silicon carbide, boron carbide and free carbon can be produced by a number of techniques such as, for example, jet milling or ball milling in a liquid dispersion.

In carrying out the present process, the carbonaceous organic material can be introduced by a number of techniques and heat-decomposed before or after the green body is formed. If the carbonaceous organic material is a solid, it is preferably admixed in the form of a solution with the silicon carbide powder and boron carbide to substantially coat the particles. The wet mixture can then be treated to remove the solvent, and the resulting dry mixture can be heated to decompose the carbonaceous organic material producing free carbon in situ before the mixture is formed into a green body. If desired, the wet mixture can be formed into a green body and the solvent removed therefrom. In this way, a substantially uniform coating of the organic material on the silicon carbide powder is obtained which on decomposition produces a uniform distribution of free carbon. The green body is then heated to decompose the carbonaceous organic material to produce free carbon in situ and diffuse away gaseous products of decomposition before sintering initiates. The solvent can be removed by a number of techniques such as by evaporation or by freeze drying, i.e., subliming off the solvent in vacuum from the frozen dispersion. Likewise, if the carbonaceous organic material is a liquid, it can be admixed with the silicon carbide powder and boron carbide, and the wet mixture heated to decompose the organic material and form free carbon, or the wet mixture can be formed into a green body which is then heated to decompose the organic material to form free carbon in situ and diffuse away gaseous products of decomposition. The heat-decomposition of the carbonaceous organic material should be carried out in an atmosphere in which the components being heated are substantially inert or which has no significant deteriorating effect on the components being heated such as argon or a vacuum. Preferably, the carbonaceous organic material in the green body is heat-decomposed in the sintering furnace as the temperature is being raised to sintering temperature.

In an alternative embodiment, the boron carbide can be formed in situ before or after the green body is formed by a number of techniques. For example, an additional amount of the carbonaceous organic material can be used to provide, upon heat-decomposition, a substantially stoichiometric amount of elemental carbon for reaction with elemental boron to form boron carbide. Likewise, a boron compound which completely decomposes at a temperature ranging from about 50° C to about 1,400° C to yield elemental boron of submicron size and gaseous product of decomposition can be used as a source of elemental boron. The boron and elemental carbon can be reacted in situ to form the submicron boron carbide particles.

The boron compound can be a solid or liquid at room temperature and it can be introduced by a number of techniques in substantially the same manner as the carbonaceous organic material is introduced. Representative of boron compounds useful in the present invention as a source of elemental boron are lithium borohydride $LiBH_4$, trivinylboron $(C_2H_3)_3B$, and triphenylboron $(C_6H_5)_3B$.

A number of techniques can be used to shape the powder mixture into a green body. For example, the powder mixture can be extruded, injection molded, die-pressed isostatically pressed or slip cast to produce the green body of desired shape. Any lubricants, binders or similar materials used in shaping the powder mixture should have no significant deteriorating effect on the green body or the resulting sintered body. Such materials are preferably of the type which evaporate on heating at relatively low temperatures, preferably below 200° C, leaving no significant residue. The green body, preferably, should have a density of at least about 50% to promote densification during sintering and achieve attainment of the desired density of at least 85%.

Sintering of the green body is carried out in an atmosphere in which it is substantially inert, i.e. an atmosphere which has no significant deteriorating effect on its properties such as, for example, argon, helium or a vacuum. Ordinarily, the sintering atmosphere ranges from a substantial vacuum to atmospheric pressure but it is preferably at atmospheric pressure.

Sintering is carried out at a temperature ranging from about 2,000° C up to below the melting temperature of the boron carbide-silicon carbide eutectic which is 2,250° C for the pure eutectic. To insure against any melting of the boron carbide-silicon carbide eutectic, the maximum sintering temperature is preferably about 2,200° C. The preferred sintering temperature ranges from about 2,050° C to 2,180° C. Sintering temperatures below about 2,000° C do not produce the present sintered body with a density of at least 85%. The particular sintering temperature is determinable empirically and depends largely on the final density desired in the sintered product with higher final densities requiring higher sintering temperatures.

The sintered body of the present invention has a density of at least about 85% or higher. The present sintered body having a density of 90% or higher is usually one wherein most of or all of the residual pores are closed, i.e., non-interconnecting, and such a sintered body is preferred since it is impervious and highly resistant to internal oxidation at elevated temperatures. Also, the higher the density of the sintered product, the greater is its hardness. For most applications, as a practical matter, the present sintered product has a density preferably ranging from about 90% to about 99%.

The sintered body of the present invention is polycrystalline and has a significantly or substantially uniform microstructure. It is composed of silicon carbide, boron carbide, and free elemental carbon. The composition of the silicon carbide in the sintered body ranges from α-SiC alone to β-SiC alone with all mixtures of α- and β-silicon carbides falling within said range. The α-SiC and β-SiC exhibit essentially the same morphology which is largely determined by the boron carbide present. Specifically, the silicon carbide is of a significantly or substantially uniform fine grain size having an average grain size of less than 10 microns and preferably an average grain size of about 2–4 microns. The boron carbide phase can be of a composition wherein the boron/carbon molar ratio ranges from 6.5 to 4.0. The boron carbide is present in an amount ranging from about 10% by weight to about 30% by weight based on the total amount of silicon carbide and boron carbide present. A minor portion of the boron, usually about 0.4% by weight, is in solid solution with the β- and α-silicon carbides. The boron carbide is significantly or substantially uniformly dispersed throughout the silicon carbide microstructure or sintered body forming fine grains ranging in size from about 1 micron to about 3 microns. The sintered body also contains free carbon ranging from an amount which is detectable by electron transmission analysis, i.e., as low as about 0.001% by weight, up to about 1% by weight based on the total amount of silicon carbide and boron carbide. The free carbon is in the form of particles substantially submicron in size, which are substantially uniformly distributed throughout the sintered body.

Since the present sintered product has a substantially stable microstructure, it substantially retains its room temperature mechanical properties through a wide temperature range, i.e., temperatures ranging from substantially below 0° C. Specifically, the sintered product undergoes no significant change in density or mechanical properties after substantial exposure in air to temperatures ranging up to about 1,400° C, and after substantial exposure in an atmosphere in which it is substantially inert such as argon or vacuum to temperatures ranging up to about 2,190° C. Such properties make it particularly useful for high temperature applications such as heat exchangers. Although, at temperatures of 2,000° C or higher, β-SiC in the present sintered product transforms to α-SiC, the newly formed α-SiC grains cannot grow significantly because they impinge on and are blocked by the substantial number of boron carbide grains already present substantially uniformly throughout the product. As a result, any additional transformation of β-SiC, even when all the silicon carbide in the sintered product is β-SiC, has no significant effect on mechanical properties of the product.

The present invention makes it possible to fabricate complex shaped polycrystalline silicon carbideboron carbide ceramic articles directly which heretofore could not be manufactured. The present sintered product can be produced in the form of a useful complex shaped article without machining such as an impervious crucible, a thin walled tube, a long rod, a spherical body, or a hollow shaped article. Specifically, the dimensions of the present sintered product differ from those of its green body by the extent of shrinkage, i.e., densification, which occurs during sintering. Also, the surface characteristics of the sintered body depend on those of the green body from which it is formed, i.e., it has a substantially smooth surface if the green body from which it is formed has a smooth surface.

The invention is further illustrated by the following Examples which, unless otherwise noted, were carried out as followed:

All sintering was carried out in a carbon-element resistance furnace, which was always initially purged with the sintering atmosphere, by bringing the furnace up to sintering temperature in about one hour, holding at sintering temperature for 20 minutes, shutting the furnace off and furnace-cooling to room temperature.

Sintered products were subjected to metallographic analyses and X-ray analyses. p The density of the sintered body was determined by liquid displacement.

% Density of a green or sintered body, given herein, is fractional density and was calculated as follows using 2.52 g/cc as specific weight for boron carbide and 3.21 g/cc as specific weight for silicon carbide:

$$= \left( \frac{\text{Weight of body}}{\text{Volume of body}} \right) \times \left( \frac{\frac{1}{3.21} (\text{wt \% SiC}) + \frac{1}{2.52} (\text{wt \% boron carbide})}{100\%} \right)$$

In the case of a sintered specimen, the weight % of boron carbide and of silicon carbide is based on the composition of the starting mixture since there is no significant weight loss between the green and sintered forms of a body in the present process.

EXAMPLE 1

A carbon-rich silicon carbide powder prepared by a pyrolytic process was used. Specifically, it was a powder dispersion, submicron in particle size, composed of cubic β-silicon carbide with elemental carbon uniformly and intimately dispersed therein in an amount of 0.35% by weight of the β-SiC. The dispersion contained 0.1% by weight $O_2$. The β-SiC particles were composed of crystallites having a mean surface average crystallite size of 0.22 micron and a specific surface area of 8.2 m²/g. To reduce its $O_2$ content, technical grade boron carbide powder was calcined in low pressure argon (100 Torr) at 1480° C for 30 minutes before use. The boron carbide powder, which was characterized by spectrographic and chemical analysis, was of submicron particle size composed of crystallites having a mean surface average crystallite size of 0.15 micron and a specific surface area of 16.1 m²/g. In addition, the calcined powder contained impurities in an amount of almost 4% by weight of the calcined powder. These impurities were of the type normally found in boron carbide powder such as O, N, Fe, and Mg.

300 grams of the silicon carbide and elemental carbon powder dispersion were ball milled with 33.9 grams of the calcined boron carbide powder in a solution of ½% aluminum stearate and ½% oleic acid in benzene for 5 hours to produce a uniform powder dispersion. The resulting slurry was then dried under a heat lamp and the powder screened through a 40-mesh sieve. Based on the total amount of silicon carbide and boron carbide, the elemental carbon was present in an amount of about 0.32% by weight and the boron carbide was present in an amount of 10.1% by weight.

About 2 grams of the resulting uniform powder dispersion was die-pressed into a bar 0.165 inch × 0.165 inch × 1.5 inches in size. A number of bars of substantially the same size, each with a green density of about 52%, were prepared.

Each of the bars was sintered at a temperature of 2,080° C for 20 minutes at 200 mm of argon.

All of the resulting sintered bars were of the same size. The density of one of the sintered bars was determined to be 3.02 g/cc corresponding to 97% of theoretical.

Ten of the sintered bars were tested for flexural strength (3 point bending) at room temperature and yielded a value of 74,000 psi with a standard deviation of 16,000 psi.

One of the sintered bars was exposed to a temperature of 1400° C in air for a period of 200 hours and showed formation of a silica layer of about 15 microns thick over its surface but no further degradation.

EXAMPLE 2

In this example materials used were the same as set forth in Example 1 except that the boron carbide was used in an amount of 1 weight %. The procedure used was substantially the same as that set forth in Example 1 except that about 3 grams of the resulting dry uniform powder dispersion was die-pressed to form a pellet having a density of about 52%.

The pellet was sintered at a temperature of 2090° C for 20 minutes in an atmosphere of argon at atmospheric pressure. The density of the sintered pellet was determined and its microstructure examined. The results are shown in Table I.

EXAMPLES 3-10

In each of these examples the materials and procedure used in forming a green pellet was the same as that set forth in Example 2 except for the boron carbide content which is shown in Table I. Each pellet was about the same size and had a density of about 52%.

Each green pellet was sintered as set forth in Example 2 but at the sintering temperature shown in Table I. The properties of the resulting sintered pellets are shown in Table I.

ing an average grain size of about 4 microns, boron carbide with a grain size of about 1 micron and a few isolated grains of α-silicon carbide of a relatively small size, i.e., about 100 microns.

The microstructure of each of the sintered products of Examples 5–7 showed silicon carbide of the same morphology with an average grain size of about 3 microns, boron carbide grains of about 1 micron in size but no large tabular α-silicon carbide grains.

In Example 6 α-silicon carbide was determined by X-ray diffraction analyses. It was present in an amount of about 27% by weight based on the total amount of silicon carbide present. However no large tabular grains were detectable by optical microscopy in etched sections which means that the α-silicon carbide grains become morphologically identical to the β-silicon carbide grains.

None of the sintered products of Examples 4–7 showed any evidence of melt formation.

What is claimed is:

1. A polycrystalline sintered body having a density of at least about 85% of the average theoretical density for silicon carbide and boron carbide based on the amounts thereof present consisting essentially of silicon carbide, boron carbide and free carbon, said silicon carbide ranging from α-silicon carbide to β-silicon carbide with all mixtures of α-silicon carbide and β-silicon carbide falling within said range, said silicon carbide having a significantly uniform grain size having an average grain size of less than 10 microns, said boron carbide being present in an amount ranging from about 10% to about 30% by weight based on the total amount of silicon carbide and boron carbide, said boron carbide being significantly uniformly dispersed throughout said body in the form of fine grains, said free carbon being in the form of particles substantially submicron in size present in an amount ranging from about 0.001% by weight to about 1% by weight based on the total amount of silicon carbide and boron carbide.

2. The sintered body according to claim 1 wherein said silicon carbide is α-silicon carbide.

3. The sintered body according to claim 1 wherein said silicon carbide is β-silicon carbide.

4. The sintered body according to claim 1 in the form of a tube.

TABLE I

| Ex. No. | Starting Mixture Wt % Boron Carbide | Sintering Temperature ° C | Sintered Pellet Density g/cc | Sintered Pellet Density % | Sintered Pellet Microstructures |
|---|---|---|---|---|---|
| 2 | 1.0 | 2090 | 2.98 | 92.8 | Isolated large α SiC grain + feathers |
| 3 | 6.0 | 2080 | 3.01 | 94.9 | Same |
| 4 | 11.3 | 2080 | 3.02 | 97.0 | Few isolated α tabular grains |
| 5 | 21.5 | 2080 | 2.91 | 95.1 | Fine grained uniform |
| 6 | 25.0 | 2090 | 2.79 | 92.6 | Fine grained uniform |
| 7 | 27.0 | 2090 | 2.65 | 88.3 | Fine grained uniform |
| 8 | 35.0 | 2080 | 2.44 | 83.3 | n.d. |
| 9 | 50.0 | 2080 | 2.16 | 76.8 | n.d. |
| 10 | 90.0 | 2160 | 2.07 | 80.6 | n.d. |

The sintered pellets of Table I had a smooth surface since the green bodies from which they were formed had a smooth surface. The sintered pellets were sectioned, ground, polished and thermally etched at 1500° C in argon for optical metallography. In addition, from some of the sintered specimens, thin sections were prepared for transmission electron microscopy.

Examples 4–7 of Table I illustrate the present invention. Examination of the microstructures of the sintered specimens of Examples 4–7 showed a minor amount, less than 1% by weight, of particles of free carbon, substantially submicron in size, and the boron carbide phase distributed substantially uniformly throughout the sintered products. Specifically, the Example 4 microstructure showed a fine grained silicon carbide hav-